United States Patent
Torsner et al.

(10) Patent No.: US 9,882,683 B2
(45) Date of Patent: Jan. 30, 2018

(54) AUTONOMOUS TRANSMISSION FOR EXTENDED COVERAGE

(75) Inventors: Per Johan Torsner, Masaby (FI); Eva Englund, Linköping (SE); Stefan Parkvall, Stockholm (SE); Mats Fredrik Sagfors, Kyrkstätt (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 971 days.

(21) Appl. No.: 11/536,119

(22) Filed: Sep. 28, 2006

(65) Prior Publication Data

US 2008/0080424 A1    Apr. 3, 2008

(51) Int. Cl.
*H04J 3/00* (2006.01)
*H04L 1/18* (2006.01)
*H04L 1/00* (2006.01)

(52) U.S. Cl.
CPC ............ *H04L 1/189* (2013.01); *H04L 1/0009* (2013.01); *H04L 1/1819* (2013.01); *H04L 1/0018* (2013.01)

(58) Field of Classification Search
CPC ..... H04L 1/0009; H04L 1/189; H04L 1/1819; H04L 1/0018
USPC ....... 370/330, 328, 329, 342, 392, 349, 538, 370/464; 714/349, 748, 749
See application file for complete search history.

(56) References Cited

U.S. PATENT DOCUMENTS 5,629,948 A * 5/1997 Hagiwara et al. ............ 714/748
5,745,502 A * 4/1998 Khayrallah et al. .......... 714/751
6,801,512 B1 * 10/2004 Cudak et al. ................. 370/332
6,977,888 B1 * 12/2005 Frenger et al. ............... 370/218
7,554,985 B2 * 6/2009 Ihm et al. ..................... 370/394
7,864,740 B2 * 1/2011 Yang .................... H04B 7/2621 370/337
2002/0075842 A1 * 6/2002 Ghosh et al. ................. 370/347
2003/0152031 A1 * 8/2003 Toskala et al. ............... 370/236

(Continued)

FOREIGN PATENT DOCUMENTS

CN       1722652 A       1/2006
EP    1 389 847 A1       2/2004

(Continued)

OTHER PUBLICATIONS

3GPP TS 25.435 V7.1.0 (Jun. 16, 2006), 3rd Generation Partnership Project; Technical Specification Group Radio Access Network; UTRAN $I_{ub}$ Interface User Plane Protocols for Common Transport Channel Data Streams (Release 7).

(Continued)

*Primary Examiner* — Mang Yeung

(57) ABSTRACT

A user equipment unit (30) and a base station node (28) which is configured for operation with a synchronous HARQ protocol and with capability of sending data on an E-DCH channel either (1) in a nominal mode in single transmission time intervals of a predetermined length, or (2) in an extended mode in a pseudo transmission time interval. The pseudo transmission time interval comprises a first transmission time interval in which the data is transmitted and a second transmission time interval in which the data is re-transmitted. The second transmission time interval is consecutive to the first transmission time interval, and the first transmission time interval and the second transmission time interval are each of the (same) predetermined length.

73 Claims, 6 Drawing Sheets

(56) References Cited

U.S. PATENT DOCUMENTS

| | | | |
|---|---|---|---|
| 2004/0147236 A1 | 7/2004 | Parkvall et al. | |
| 2005/0249120 A1 | 11/2005 | Heo et al. | |
| 2005/0276266 A1 | 12/2005 | Terry | |
| 2006/0026490 A1* | 2/2006 | Rinne et al. | 714/774 |
| 2006/0159016 A1 | 7/2006 | Sågfors et al. | |
| 2006/0221885 A1* | 10/2006 | Nagaraj | 370/328 |
| 2006/0256757 A1* | 11/2006 | Kuusela et al. | 370/335 |
| 2007/0040703 A1* | 2/2007 | Akkarakaran et al. | 340/961 |
| 2007/0047547 A1* | 3/2007 | Conner et al. | 370/392 |
| 2008/0045255 A1* | 2/2008 | Revel et al. | 455/510 |
| 2008/0310409 A1* | 12/2008 | Larsson et al. | 370/389 |
| 2009/0164862 A1* | 6/2009 | Sagfors et al. | 714/748 |

FOREIGN PATENT DOCUMENTS

| | | |
|---|---|---|
| EP | 1 545 040 A1 | 6/2005 |
| EP | 1 594 246 A2 | 11/2005 |
| JP | 08-008874 | 1/1996 |
| JP | 11-266216 | 9/1999 |
| JP | 2001-513277 | 8/2001 |
| JP | 2003-174435 A | 6/2003 |
| JP | 2004-260713 A | 9/2004 |
| JP | 2007-536876 A | 12/2007 |
| WO | WO 2005/071874 A1 | 8/2005 |
| WO | 05/109729 | 11/2005 |
| WO | 2005/109729 A1 | 11/2005 |
| WO | WO 2005109729 A1 * | 11/2005 |
| WO | WO 2006/083077 A1 | 8/2006 |

OTHER PUBLICATIONS

3GPP TS 25.321 V7.1.0 (Jun. 23, 2006), 3rd Generation Partnership Project; Technical Specification Group Radio Access Network; Medium Access Control (MAC) protocol specification (Release 7).

3GPP TS 25.425 V7.1.0 (Jun. 16, 2006), 3rd Generation Partnership Project; Technical Specification Group Radio Access Network; UTRAN Iur interface user plane protocols for Common Transport Channel data streams (Release 7).

Soljanin E., *Hybrid ARQ in Wireless Networks*, presented at Wireless System Lab Seminar, Texas A&M University, Apr. 2003.

DIMACS Workshop on Network Information Theory, Mar. 2003.

International Search Report dated Aug. 23, 2007 in corresponding PCT application PCT/SE2006/050404.

Chase, "Code Combining—A Maximum-Likelihood Decoding Approach for Combining an Arbitrary Number of Noisy Packets", IEEE Trans. on Communications, vol. COM-33, No. 5, May 1985, pp. 385-393.

Australian Notice of Acceptance dated Apr. 14, 2011 in Australian Application 2006348714.

Chinese Office Action and English translation thereof dated May 4, 2012 in Chinese application 200680055918.

Notice of Allowance issued in Japanese Application No. 2009-530306 dated Nov. 6, 2012.

Japanese Office Action dated Nov. 7, 2011 in Japanese application 2009-530306.

3GPP TSG-RAN WG1 #38, R1-040898, "Impact of Synchronous HARQ", Prague, Czech Republic, Aug. 16-20, 2004.

Supplementary European Search Report dated Dec. 5, 2012 in EP Application 06844025.4.

European Office Communication issued in Application No. 06844025 dated Apr. 8, 2013.

Japanese Office Action issued in Japanese Application Serial No. 2009-530306, dated May 11, 2012.

Chinese Office Action issued in Application No. 200680055918 dated Mar. 5, 2013.

Chinese Search Report issued in Application No. 200680055918 dated Feb. 19, 2013.

\* cited by examiner

AUTONOMOUS TRANSMISSION FOR EXTENDED COVERAGE

BACKGROUND

I. Technical Field

The present invention pertains generally to telecommunications, and particularly to fast hybrid ARQ (HARQ) protocols between mobile terminals and a radio network, including but not limited to HARQ protocols in a High Speed Uplink Packet Access (HSUPA) system such as that operated (for example) in a Universal Mobile Telecommunications System (UMTS) terrestrial radio access network (UTRAN).

II. Related Art and Other Considerations

In a typical cellular radio system, mobile terminals (also known as mobile stations and mobile user equipment units (UEs)) communicate via a radio access network (RAN) to one or more core networks. The user equipment units (UEs) can be mobile stations such as mobile telephones ("cellular" telephones) and laptops with mobile termination, and thus can be, for example, portable, pocket, hand-held, computer-included, or car-mounted mobile devices which communicate voice and/or data with radio access network.

The radio access network (RAN) covers a geographical area which is divided into cell areas, with each cell area being served by a base station. A cell is a geographical area where radio coverage is provided by the radio base station equipment at a base station site. Each cell is identified by a unique identity, which is broadcast in the cell. The base stations communicate over the air interface (e.g., radio frequencies) with the user equipment units (UE) within range of the base stations. In the radio access network, several base stations are typically connected (e.g., by landlines or microwave) to a radio network controller (RNC). The radio network controller, also sometimes termed a base station controller (BSC), supervises and coordinates various activities of the plural base stations connected thereto. The radio network controllers are typically connected to one or more core networks.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) access technology.

As wireless Internet services have become popular, various services require higher data rates and higher capacity. Although UMTS has been designed to support multi-media wireless services, the maximum data rate is not enough to satisfy the required quality of services.

In a forum known as the Third Generation Partnership Project (3GPP), telecommunications suppliers propose and agree upon standards for third generation networks and UTRAN specifically, and investigate enhanced data rate and radio capacity. One result of the forum's work is the High Speed Downlink Packet Access (HSDPA) for the downlink, which was introduced in 3GPP WCDMA specification Release 5. HSDPA features a high speed channel (HSC) controller that functions, e.g., as a high speed scheduler by multiplexing user information for transmission over the entire HS-DSCH bandwidth in time-multiplexed intervals (called transmission time intervals (TTI)). Since HSDPA uses code multiplexing, several users can be scheduled at the same time.

Concerning High Speed Downlink Packet Access (HSDPA) generally, see, e.g., 3GPP TS 25.435 V7.1.0 (Jun. 16, 2006), 3rd Generation Partnership Project; Technical Specification Group Radio Access Network; UTRAN $I_{ub}$ Interface User Plane Protocols for Common Transport Channel Data Streams (Release 7), which discusses High Speed Downlink Packet Access (HSDPA) and which is incorporated herein by reference in its entirety. Also incorporated by reference herein as being produced by the forum and having some bearing on High Speed Downlink Packet Access (HSDPA) or concepts described herein include: 3GPP TS 25.321 V7.1.0 (Jun. 23, 2006), 3rd Generation Partnership Project; Technical Specification Group Radio Access Network; Medium Access Control (MAC) protocol specification (Release 7); 3GPP TS 25.331 V7.1.0 (Jun. 23, 2006), 3rd Generation Partnership Project; Technical Specification Group Radio Access Network; Radio Resource Control (RRC); Protocol Specification (Release 7); 3GPP TS 25.425 V7.1.0 (Jun. 16, 2006), 3rd Generation Partnership Project; Technical Specification Group Radio Access Network; UTRAN Iur interface user plane protocols for Common Transport Channel data streams (Release 7); and 3GPP TS 25.433 V7.1.0 (Jun. 20, 2006), 3rd Generation Partnership Project; Technical Specification Group Radio Access Network; UTRAN Iub interface Node B Application Part (NBAP) signaling (Release 7).

The High Speed Downlink Packet Access (HSDPA) was followed by introduction of High Speed Uplink Packet Access (HSUPA) with its Enhanced Dedicated Channel (E-DCH) in the uplink in 3GPP WCDMA specification Release 6.

The new channels of HSDPA and HSUPA are designed to support IP-based communication efficiently, providing enhanced end-user performance and increased system capacity. Although originally designed for interactive and background applications, they provide as good or even better performance for conversational services than the existing circuit switched (CS) bearers.

E-DCH is dedicated uplink channel (from a user equipment unit (UE) to a Node-B) that has been enhanced for IP transmission. Enhancements include using a short transmission time interval (TTI); fast hybrid ARQ (HARQ) between mobile terminal and the Node-B (with soft combining); scheduling of the transmission rates of mobile terminals from the Node-B. In addition, E-DCH retains majority of the features characteristic for dedicated channels in the uplink.

E-DCH comes with several channels from each UE. For example, the DPCCH carries pilot symbols and parts of the outband control signaling. Remaining outband control signalling for the enhanced uplink, e.g., scheduling requests, is carried on the E-DPCCH, while the E-DPDCH carries the data transmitted using the enhanced uplink features.

In terms of the User Plane Radio Interface Protocol Architecture of HSUPA, the HARQ protocol and scheduling function belong to the Medium Access Control High Speed (MAC-hs) sublayer which is distributed across Node-B and the user equipment unit. Parameters of the protocols are configured by signaling in the control plane. This signaling is governed by Radio Resource Control (RRC) protocol. The service that is offered from RLC sublayer for point-to-point connection between a core network (CN) and the user equipment unit is referred to as a Radio Access Bearer (RAB). Each RAB is subsequently mapped to a service offered from the MAC layer. This service is referred to as a Logical Channel (LC).

In basic operation of HSUPA, a Node-B and user equipment unit perform an initial setting process for transmitting/ receiving the E-DCH. Upon completion of setup, the user equipment unit informs the Node-B of scheduling information, e.g., information about transmission power of the UE from which uplink channel information can be known, information about the amount of data store in a buffer of the user equipment unit to be transmitted, and the like. The Node-B receives the scheduling information and determines whether and how to perform its own scheduling of the E-DCH for the user equipment unit (based on the scheduling information received from the user equipment unit). If it is possible to schedule the user equipment unit for the E-DCH, the Node-B generates scheduling allocation information which is sent to the user equipment unit. The scheduling information sent to the user equipment unit includes such information as data rate, transmission timing, etc. Upon receiving from the Node-B the scheduling information, the user equipment unit transmits the E-DCH using such scheduling information, and also transmits a E-DCH transport format combination indicator (E-TFCI) of the transmitted E-DCH.

Upon receiving a E-DCH, the Node-B determines whether any errors have occurred in the E-DCH or the TFRI. If an error occurs in either the TFRI or the E-DCH, the Node-B transmits a negative acknowledgement (NACK) to user equipment unit. On the other hand, if no error occur, the Node-B transmits an acknowledgement (ACK) to user equipment unit. The NACK and ACK are transmitted on the E-DCH HARQ Acknowledgement Indicator Channel (E-HICH). The NACK and ACK, and retransmissions attending receipt of a NACK, are the subject of the fast hybrid ARQ (HARQ) utilized between mobile terminal and the Node-B.

Hybrid ARQ technology in general is described in United States Patent Publication US 2004/0147236 and U.S. patent application Ser. No. 10/477,414, both entitled "METHOD AND SYSTEM OF RETRANSMISSION", Soljanin E., *Hybrid ARQ in Wireless Networks*, presented at Wireless System Lab Seminar, Texas A&M University, April 2003, and DIMACS Workshop on Network Information Theory, March 2003; and, EP 1389847 A1; all of which are incorporated herein by reference.

The fast hybrid ARQ (HARQ) between mobile terminal and the Node-B for HSUPA involves a set of HARQ transmitting and receiving entities, located in Node B and UE respectively, which entities are also referred to as HARQ processes. The maximum number of HARQ processes per UE is usually predefined. These data flows from the user equipment unit to the Node-B can have different Quality of Services (QoS), e.g. delay and error requirements and may require a different configuration of HARQ instances.

The fast hybrid ARQ (HARQ) between mobile terminal and the Node-B for HSUPA also employs soft combining. That is, the Node-B temporarily stores data having an error and subsequently combines the stored data with a retransmitted portion of the corresponding data, the resultant combination hopefully thus being error free.

High Speed Uplink Packet Access (HSUPA), or at least E-DCH, is also discussed in one or more of the following (all of which are incorporated by reference herein in their entirety):

U.S. Patent Publication US 2005/0249120;

U.S. patent application Ser. No. 11/035,021, filed Jan. 14, 2005, entitled "UPLINK CONGESTION DETECTION AND CONTROL BETWEEN NODES IN A RADIO ACCESS NETWORK";

U.S. Provisional Patent Application Ser. No. 60/659,429, filed Mar. 9, 2005, entitled "BLER MEASUREMENTS FOR OUTER-LOOP POWER CONTROL OF IDLE ENHANCED UPLINK CHANNELS";

U.S. Provisional Patent Application Ser. No. 60/750,068, filed Dec. 14, 2005, entitled "DPDCH DESPREADING-ON-DEMAND (DOD) FOR WCDMA";

U.S. Provisional Patent Application Ser. No. 60/804,687, filed Jun. 14, 2006, entitled "PACKET DISCARD TIMER FOR E-DCH".

E-DCH has been specified with two configurable transmission time intervals (TTIs): a 10 ms TTI and a 2 ms TTI. The 2 ms TTI offers superior performance in many situations due to the lower latency and the possibility to utilize more HARQ retransmissions within a certain time bound.

Even if the 2 ms TTI is preferable in many situations, coverage may be limited. For example, if a protocol data unit (PDU) size of e.g. 336 bits (commonly used in WCDMA) needs to be transmitted, this corresponds to 168 kbps data rate (for which many networks may not be planned). However, by using several HARQ retransmissions, the effective data rate is reduced but the data can also be transmitted at the cell border (but with an increased delay). The HARQ round trip time (RTT) with a 2 ms TTI is 16 ms, which means that, e.g., 3 HARQ retransmissions (not including the original transmission) takes 2+3*16 ms=50 ms and corresponds to an efficient data rate of 168/4=42 kbps.

Since it is sometimes known in advance that several retransmissions will be needed, consideration has been given to performing autonomous retransmissions for the E-DCH. In the example above, the transmitter could (if it knows that three retransmissions are needed) perform all four transmissions in consecutive TTIs, thus completing the transmissions in 8 ms instead of 50 ms. For a discussion of autonomous retransmissions for an asynchronous HARQ as used in HSDPA, see WO/2005/109729, entitled "METHOD AND SYSTEM FOR PROVIDING AUTONOMOUS RETRANSMISSIONS IN A WIRELESS COMMUNICATION SYSTEM", which is incorporated herein by reference. In an asynchronous HARQ protocol it is relatively straight forward to apply autonomous retransmissions since the HARQ process is explicitly signaled for each (re) transmission. The transmitter can thus, e.g., chose to send consecutive TTIs in the same HARQ process.

The HARQ protocol finally specified for E-DCH is synchronous, rather than being asynchronous. A synchronous HARQ protocol for E-DCH means that retransmissions takes place a fixed number of TTIs after the previous (re)transmission. Autonomous retransmissions are therefore not straightforward to introduce for E-DCH.

One option is to modify the HARQ protocol from a synchronous protocol to an asynchronous protocol. However, such modification from synchronous to asynchronous would require relatively large modifications in the channel structure and in the specifications, and therefore is not very attractive.

Another problem with introducing longer TTIs by concatenating several 2 ms TTIs is the ACK/NACK feedback signaling. In FIG. 1 the HARQ feedback mechanism is illustrated for an example HARQ protocol with four HARQ processes (E-DCH has eight HARQ processes). The HARQ feedback signals in E-DCH are sent a fixed time after a received TTI and the transmitter knows which HARQ process the feedback refers to based on the time of reception.

As understood with reference to FIG. 1, if a 4 ms TTI is created by repeating data in HARQ process 1 and 2, the ACK/NACK signal sent after decoding process 2 would come too late to be able to do a retransmission in the correct HARQ process. The user equipment unit (UE) would only know if it is supposed to perform a retransmission or not when process 1 has already started in the next HARQ process cycle.

What is needed, therefore, and an object of the present invention, are apparatus, methods, and techniques for providing autonomous retransmissions for the E-DCH channel.

BRIEF SUMMARY

For a system utilizing synchronous HARQ protocol the present technology advantageously maintains synchronousity, current channel structure, and current codingYet the technology affords use (in a nominal mode) of a standardized or conventional transmission time interval (TTI) length, as well as use (in an extended mode) of a pseudo TTI or artificial TTI of different length, the different length being related to (e.g., a multiple of) the standardized or conventional transmission time interval (TTI) length.

The pseudo TTI actually comprises two consecutive conventional TTIs, e.g., a first transmission time interval and a second transmission time interval, with the first transmission time interval being used for original transmission of data and the second transmission time interval being used for a re-transmission of that same data. The present technology with its provision of a nominal mode and an extended mode offers great flexibility with a minimum of modifications to standards and existing implementations. Indeed, by allowing only the conventional TTI and pseudo TTI, current conventional ACK/NACK feedback signaling can be utilized with an autonomous HARQ protocol, preferably with processing requirements tightened in terms of ACK/NACK timing for the base station (e.g., Node-B). Even if the second transmission time interval is a retransmission of the same (user) data, the applied puncturing on the physical layer is different (known as a different redundancy version) so the transmission and the retransmission are not identical.

The present technology can advantageously be utilized with different types of systems and channels. For example, the present technology can be used for synchronous HARQ protocol for E-DCH, and thus can maintain the current channel structure for E-DCH, and the current TFCI coding for E-DCH, and yet afford for E-DCH use (in the nominal mode) of a standardized or conventional transmission time interval (TTI) length of 2 ms TTI as well as use (in the extended mode) of a pseudo TTI or artificial TTI appearing to have a length of 4 ms.

As another non-limiting example, the present technology can be used with UTRAN Long Term Evolution (LTE).

In one of its aspects, the technology concerns a user equipment unit which is configured for operation with a synchronous HARQ protocol and with capability of sending data on a channel either (1) in a nominal mode in single transmission time intervals of a predetermined length, or (2) in an extended mode in a pseudo transmission time interval. The pseudo transmission time interval comprises a first transmission time interval in which the data is transmitted and a second transmission time interval in which the data is re-transmitted. The second transmission time interval is consecutive to the first transmission time interval, and the first transmission time interval and the second transmission time interval are each of the (same) predetermined length.

In one implementation variation, the user equipment unit is configured for explicitly signaling that the second transmission time interval is to be combined at a base station node with the first transmission time interval. For example, the user equipment unit can set a value on another channel (e.g., on an E-DPCCH channel) to indicate that the second transmission time interval is to be combined at a base station node with the first transmission time interval.

In another implementation variation, explicit signaling is not required. Rather, the user equipment unit uses a subset of HARQ processes for the nominal mode. The subset consists of non-consecutive HARQ processes, at least some and preferably all HARQ processes of the subset being processes being one of odd numbered HARQ processes or at least some and preferably all HARQ processes of the subset being processes being one of even numbered HARQ processes. In this submode, to achieve the pseudo transmission time interval the user equipment unit, for the extended mode, uses a selected HARQ process of the subset and a HARQ process outside the subset which is numerically adjacent the selected HARQ process.

In accordance with further differing implementation variations, the user equipment unit can be configured either to mix or not to mix (1) sending of data on the channel (e.g., E-DCH channel) in the nominal mode and (2) sending of data on the channel in the extended mode. In implementation variations in which mode mixing is allowed, the user equipment unit can be configured to utilize a first (predetermined) group of HARQ processes for the nominal mode and a second (predetermined) group of HARQ processes for the extended mode.

In terms of architecture, in an example embodiment the user equipment unit can comprise a UE MAC-entity, a mode selector, and a transceiver. The UE MAC-entity serves for allocating the data to the single transmission time intervals of the channel (e.g., E-DCH channel) in the nominal mode and for allocating the data to the first transmission time interval and the second transmission time interval in the extended mode. The a mode selector specifies to the MAC-entity whether the data is to be allocated in the nominal mode or the extended mode. The transceiver communicates the data in transmission time intervals to a base station over a radio interface.

In one of its aspects, the technology concerns a base station node of a radio access network (RAN) which receives data on an uplink channel over an air interface from a user equipment unit. In an example embodiment, the node comprises a base station transceiver for communicating over the air interface with the user equipment unit; a MAC-entity configured for operation with a synchronous HARQ protocol and with capability of receiving data on the uplink channel either in the nominal mode or in the extended mode; and, an ACK/NACK generator. Preferably the ACK/NACK generator serves for generating an acknowledgement message upon receipt of a pseudo transmission time interval at a point in time at which the acknowledgement message would have been generated had a transmission time interval of the nominal mode instead been received, but with the acknowledgement message confirming the fact that the complete extended transmission (e.g., the soft combined data from the first transmission time interval of the extended mode and the second transmission time interval of the extended mode) can be/has been successfully decoded.

In one example implementation, the ACK/NACK generator is configured to generate the acknowledgement message point 4.1 ms after receipt of the first transmission time interval of the pseudo transmission time interval.

In one example embodiment, the base station further comprises a signaling handler which is configured, upon receipt of explicit signaling, for notifying the MAC-entity that the second transmission time interval is to be combined with the first transmission time interval. Such explicit signaling can occur, for example, upon receipt of a predetermined value on an E-DPCCH channel.

In another example embodiment, the base station comprises plural HARQ processes. For an example implementation which does not require explicit signaling, the MAC-entity is configured for using a subset of HARQ processes for the nominal mode. As explained previously, the subset consists of non-consecutive HARQ processes, at least some and preferably all HARQ processes of the subset being processes being one of odd numbered HARQ processes or at least some and preferably all HARQ processes of the subset being processes being one of even numbered HARQ processes. Further, the MAC-entity is configured for the extended mode for using a selected HARQ process of the subset and a HARQ process outside the subset which is numerically adjacent the selected HARQ process. In the implementation not requiring explicit signaling, the base station node is configured for detecting use of the extended mode by detecting energy on the HARQ process which is outside the subset and numerically adjacent the selected HARQ process.

In another of its aspects, the technology concerns a radio access network (RAN) comprising both a user equipment unit and a base station node. The user equipment unit is configured for operation with a synchronous HARQ protocol and with capability of sending data on a channel (e.g., E-DCH channel) either in the nominal mode or in the extended mode. The base station node communicates over the air interface with the user equipment unit and is configured for receiving the data on the channel (e.g., E-DCH channel) either in the nominal mode or in the extended mode and (preferably) for generating an acknowledgement message upon receipt of a pseudo transmission time interval at a point in time at which the acknowledgement message would have been generated had a transmission time interval of the nominal mode instead been received. The extended mode acknowledgement message confirms the fact that the complete extended transmission (e.g., the soft combined data from the first transmission time interval of the extended mode and the second transmission time interval of the extended mode) can be/has been successfully decoded In another of its aspects, the technology concerns a method of operating a radio access network (RAN). The method comprises (over an air interface from a user equipment unit to a base station node on a channel (e.g., E-DCH channel) with a synchronous HARQ protocol) selectively sending data in the nominal mode and the extended mode. The method further includes receiving the data on the channel (e.g., E-DCH channel) at the base station node either in the nominal mode or in the extended mode. Preferably, the method further includes generating (at the base station node) an acknowledgement message upon receipt of a pseudo transmission time interval at a point in time at which the acknowledgement message would have been generated had a transmission time interval of the nominal mode instead been received.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION

Figure 1:
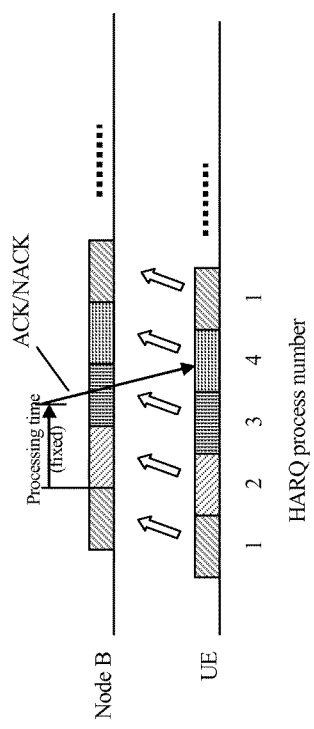
FIG. 1 is a diagrammatic view of ACK/NACK feedback signaling in E-DCH generally.

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope. In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks labeled as "processors" or "controllers" may be provided through the use of dedicated hardware as well as hardware capable of executing software in association with appropriate software. When provided by a processor, the functions may be provided by a single dedicated processor, by a single shared processor, or by a plurality of individual processors, some of which may be shared or distributed. Moreover, explicit use of the term "processor" or "controller" should not be construed to refer exclusively to hardware capable of executing software, and may include, without limitation, digital signal processor (DSP) hardware, read only memory (ROM) for storing software, random access memory (RAM), and non-volatile storage.

For a system utilizing synchronous HARQ protocol The present technology advantageously maintains the current synchronousity, HARQ protocol for E-DCH, the current channel structure for E-DCH, and the current TFCI coding for E-DCH, and yet the technology affords for E-DCH use (in a nominal mode) of a standardized or conventional transmission time interval (TTI) length, e.g., 2 ms TTI, as well as use (in an extended mode) of a pseudo TTI or artificial TTI of different length, the different length being related to (e.g., a multiple of) the standardized or conventional transmission time interval (TTI) length appearing to have a length of 4 ms.

The pseudo TTI actually comprises two consecutive conventional TTIs, e.g., a first transmission time interval and a second transmission time interval, with the first transmission time interval being used for original transmission of data and the second transmission time interval being used for a re-transmission of that same data. The present technology with its provision of a nominal mode and an extended mode offers great flexibility with a minimum of modifications to standards and existing implementations. Indeed, by allowing only the conventional 2 ms TTI and 4 ms pseudo TTI, current conventional ACK/NACK feedback signaling can be utilized with an autonomous HARQ protocol, preferably with processing requirements tightened in terms of ACK/NACK timing for the base station (e.g., Node-B) which receives the E-DCH. Even if the second transmission time interval is a retransmission of the same (user) data, the applied puncturing on the physical layer is different (known as a different redundancy versio) so the transmission and the retransmission are not identical.

The present technology can advantageously be utilized with different types of systems and channels. For example, the present technology can be used for maintains the current synchronous HARQ protocol for E-DCH, and thus can maintain the current channel structure for E-DCH, and the current TFCI coding for E-DCH, and yet affords for E-DCH use (in a the nominal mode) of a standardized or conventional transmission time interval (TTI) length of, e.g., 2 ms TTI, as well as use (in an the extended mode) of a pseudo TTI or artificial TTI appearing to have a length of 4 ms. Alternatively, as just one other example, the present technology can also be utilized with UTRAN Long Term Evolution (LTE).

Figure 2:
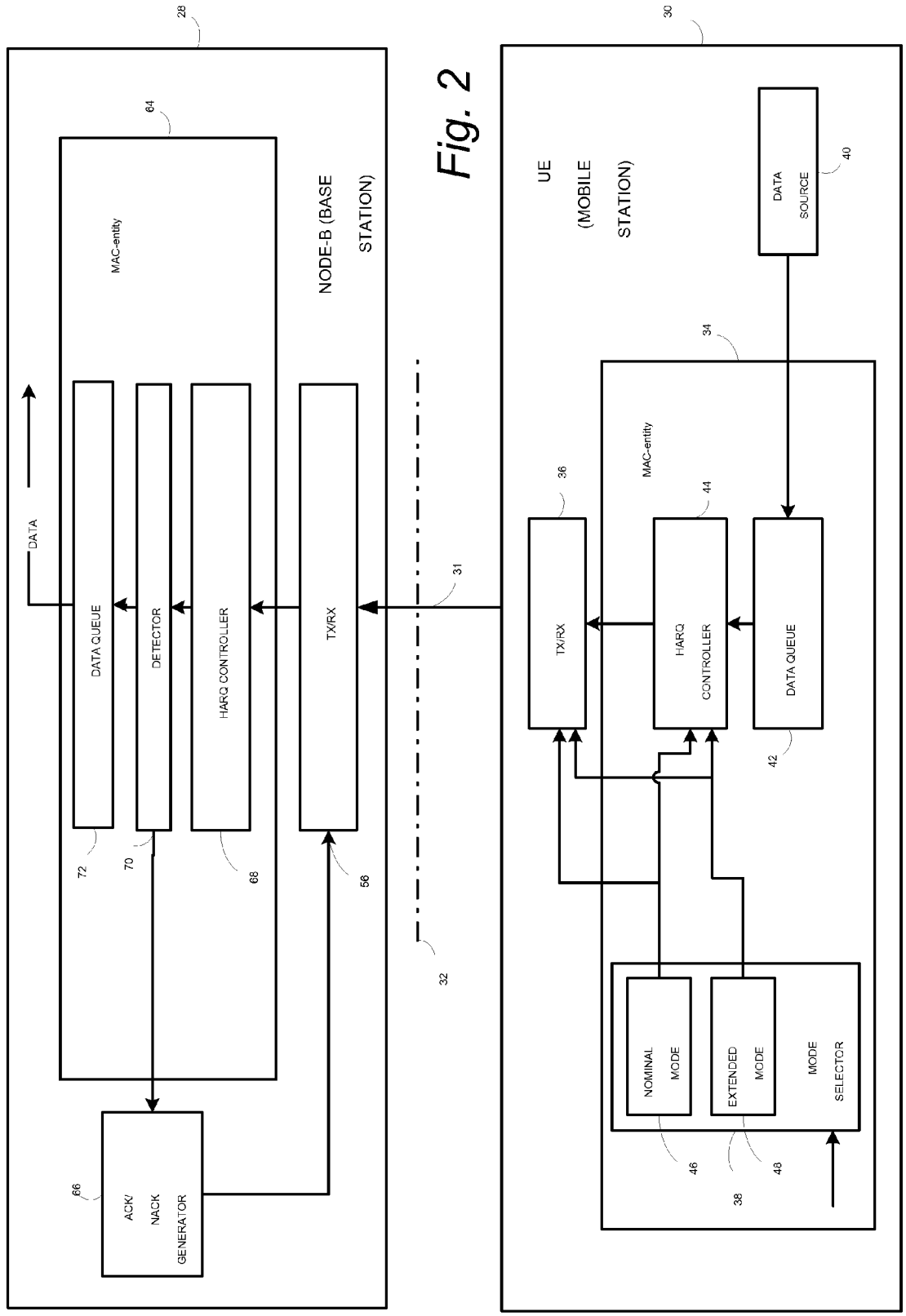
FIG. 2 is a schematic view of a radio access network (RAN) comprising a user equipment unit capable of sending data on an E-DCH in either a nominal mode or an extended mode.

As an example of the technology, FIG. 2 illustrates portions of a radio access network (RAN) including a base station node 28 (also called "Node-B") and a user equipment unit ("UE") 30. The base station node 28 and user equipment unit 30 communicate with transmissions over an air interface 32.

The transmissions over the air interface 32 are generically indicated by arrow 31 in FIG. 2, to represent the fact that the present technology can be used with different types of channels, services, and systems. For example, the arrow 31 in FIG. 2 can represent HSUPA transmissions such as E-DPDCH channel (which carries the data transmitted using the enhanced uplink features). In such case, other E-DCH-related channels, such as E-DPCCH, would be understood to be in operation by the person skilled in the art. Alternatively, arrow 31 can represent an uplink channel utilized for UTRAN Long Term Evolution (LTE)

The user equipment unit 30 of the example embodiment of FIG. 2 comprises a UE MAC-entity 34 and a UE transceiver (TX/RX) 36. The UE MAC-entity 34 in turn includes a mode selector 38. As understood by those skilled in the art, user equipment unit 30 includes numerous other unillustrated entities and functionalities, most of which are not germane to the technology herein described.

The user equipment unit 30 further includes a source of data (e.g., a source of E-DCH data for a HSUPA implementation). The data source 40 can be, for example, one or more applications which generate or otherwise originate/receive data destined for channel 31 (e.g., E-DCH-destined or E-DCH-related data) for transmission to base station node 28. For sake of simplification, FIG. 2 assumes only one flow of data from data source 40 to channel 31, and further illustrates that such data is stored in data queue 42 of UE MAC-entity 34. The channel 31-prone data stored in data queue 42 is conveyed to an appropriate HARQ process in a HARQ controller 44 which also comprises UE MAC-entity 34.

The user equipment unit 30, and particularly its UE MAC-entity 34, is configured for operation with a synchronous HARQ protocol and with capability of sending data on channel 31 either (1) in a nominal mode in single transmission time intervals of a predetermined length, or (2) in an extended mode in a pseudo transmission time interval. The pseudo transmission time interval comprises a first transmission time interval in which the data is transmitted and a second transmission time interval in which the data is re-transmitted. Both the first transmission time interval and the second transmission time interval of the pseudo transmission time interval each preferably have a length equal to the length of the single transmission time interval of the nominal mode. The second transmission time interval is consecutive to the first transmission time interval, and the first transmission time interval and the second transmission time interval are each of the (same) predetermined length.

Mode selector 38 specifies to UE MAC-entity 34 whether the channel 31-prone data is to be allocated in the nominal mode or the extended mode. To this end, mode selector 38 is depicted in FIG. 2 as comprising nominal mode process 46 and extended mode process 48. The nominal mode process 46 includes information that is used by UE MAC-entity 34 (and UE transceiver (TX/RX) 36) for operating in the nominal mode; the extended mode process 48 includes information that is used by UE MAC-entity 34 (and UE transceiver (TX/RX) 36) for operating in the extended mode. Such information includes a mode flag for each mode which signals when the mode is in effect, as well as other information and parameters utilized by UE MAC-entity 34 for operating in accordance with the various example implementations described hereinafter.

The base station node 28 of the example embodiment of FIG. 2 receives data on the channel 31 over air interface 32 from a user equipment unit 30. In the particularly illustrated example embodiment, base station node 28 comprises a base station transceiver 56 (for communicating over air interface 32 with the user equipment unit 30); a base station MAC-entity 64; and (preferably) a feedback generator (in the example form of ACK/NACK generator 66). The base station MAC-entity 64 is configured for operation with a synchronous HARQ protocol and with capability of receiving data on channel 31 either in the nominal mode or in the extended mode. The ACK/NACK generator serves for generating an acknowledgement message upon receipt of a pseudo transmission time interval at a point in time at which the acknowledgement message would have been generated had a transmission time interval of the nominal mode instead been received. The acknowledgement message for the pseudo transmission time interval confirms the fact that the complete extended transmission (e.g., the soft combined data from the first transmission time interval of the extended mode and the second transmission time interval of the extended mode) can/has been successfully decoded.

The base station MAC-entity 64 of the example embodiment of FIG. 2 further includes a base station HARQ controller 68; a detector 70 which determines when feedback is necessary or desired; and, data queue 72 in which channel 31-obtained data is stored prior to its further transmission (e.g., to a superior node or other node such as radio network controller (RNC)).

Figure 3:
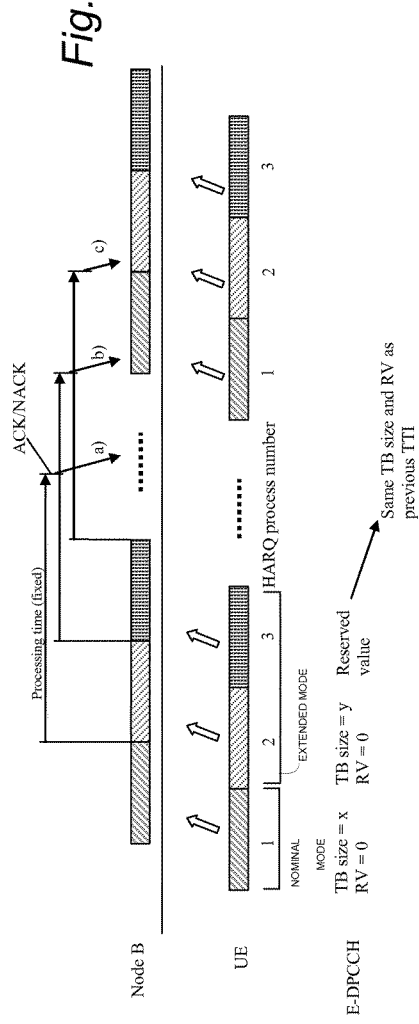
FIG. 3 is a diagrammatic view illustrating transmission of data on a channel in accordance with both a nominal mode and an extended mode.

FIG. 3 generally illustrates transmission of data on a channel (such as an E-DCH channel) by a user equipment unit (such as user equipment unit 30 of FIG. 2, for example) in accordance with both a nominal mode and an extended mode. For simplification, for FIG. 3 only three of the eight HARQ protocol processes of UE HARQ controller 44 and base station HARQ controller 68 are shown. FIG. 3 thus illustrates that, with the present technology, it is possible to either send data on the channel in one conventional or standardized TTI of predetermined length, or to perform autonomous retransmissions by using an artificial or pseudo transmission time interval comprising two consecutive conventional or standardized TTIs. A conventional or standardized transmission time interval can have a predetermined length of 2 ms, for example, whereas the pseudo transmission time interval comprises two conventional transmission time intervals and thus has an effective pseudo length of 4 ms. Other predetermined lengths for the transmission time interval are possible, but in such case the effective length of the pseudo transmission time interval will be twice the predetermined length of the transmission time interval. As used herein, the artificial pseudo transmission time interval is also called an extended TTI to distinguish from the normal or standardized transmission time interval.

As mentioned above, FIG. 3 shows three of the eight HARQ processes involved in transmission on a channel such as channel 31 (e.g., the E-DCH), each HARQ process being represented by a block of different internal shading and having an appropriate one of the numbers 1, 2, or 3. FIG. 3 shows the three HARQ processes for each of base station node 28 and user equipment unit 30, in time order from left to right. Each HARQ process corresponds to one of eight transmission time intervals, and for each transmission time interval there is a corresponding HARQ process in UE HARQ controller 44 and base station HARQ controller 68 (as indicated by like shading in the HARQ process blocks of FIG. 3). For a pair of corresponding HARQ processes, the HARQ process of UE HARQ controller 44 is shown first in time (leftmost) in FIG. 3 since UE HARQ process begins upon transmission of the transmission time interval, with the corresponding base station HARQ process being shown beginning slightly to the right of the respective UE HARQ process to reflect a transmission time delay.

In the example scenario shown in FIG. 3, HARQ process 1 is performed in accordance with the nominal mode, since the data is transmitted under auspices of UE HARQ process 1 in one transmission time interval. Upon reception of the data of transmission time interval by base station node 28, the base station HARQ process 1 handles the data and, after processing, sends feedback in the form of an ACK message or a NACK message at a point in time indicated as (a). In other words, the data of HARQ process 1 is not retransmitted automatically by user equipment unit, and is not retransmitted at all unless prompted for subsequent retransmission by receipt of a NACK message at time (a).

FIG. 3 also shows that HARQ processes 2 and 3 together perform the extended mode. Data for channel 31 (e.g., a E-DCH channel) is first transmitted in transmission time interval 2 under auspices of UE HARQ process 2, and thereafter the same data is retransmitted in transmission time interval 3 under auspices of UE HARQ process 3. Transmission time interval 2 and transmission time interval 3 collectively form the pseudo transmission time interval.

In one implementation variation, which also happens to be illustrated in FIG. 3, user equipment unit 30 is configured for explicitly signaling that the second transmission time interval (e.g., transmission time interval 3, corresponding to HARQ process 3 of FIG. 3) is to be combined at a base station node with the first transmission time interval (e.g., transmission time interval 2, corresponding to HARQ process 2 of FIG. 3). For example, user equipment unit 30 can set a value on another channel (e.g., an E-DPCCH channel) to indicate that the second transmission time interval (e.g., transmission time interval 3, corresponding to HARQ process 3 of FIG. 3) is to be combined at base station node 28 with the first transmission time interval (e.g., transmission time interval 2, corresponding to HARQ process 2 of FIG. 3). In this regard, FIG. 3 shows information carried on the other channel (e.g., E-DPCCH channel) in approximate alignment with the respective HARQ process. In order to indicate to base station node 28 that an extended or pseudo transmission time interval is used, one of the code points (values) on the other channel (e.g., E-DPCCH channel) is reserved (e.g. the largest TB size with redundancy version 3) to mean "this TTI has the same coding (TB size and redundancy version) as the previous TTI and shall be soft combined with that TTI".

Thus, the foregoing is illustrated in FIG. 3 where a normal transmission is performed in HARQ process 1, but in HARQ process 2 a transmission in an extended TTI is performed. This is not seen in the signaling for HARQ process 2 but in HARQ process 3 a reserved value of the other channel (e.g., E-DPCCH channel) is used which means that the data received in that TTI shall be combined with the data in the previous TTI.

When base station node 28 receives data in a TTI where the reserved value is not used it tries to decode it (e.g. HARQ process 1 and 2 in FIG. 3). When data is received in a TTI and the reserved code is used on the E-DPCCH, base station node 28 aborts any potentially ongoing decoding and soft combines the received data with the previous TTI. In other words, for example, when the data for HARQ process 3 is received in FIG. 3 it will be combined with the data of HARQ process 2. Thus the uplink signaling can be essentially unchanged on layer 1 (L1); only one of the values needs to be reserved for this purpose.

In another implementation variation, explicit signaling is not required. Rather, user equipment unit 30 uses a subset of HARQ processes for the nominal mode. The subset consists of non-consecutive HARQ processes, at least some and preferably all HARQ processes of the subset being processes being one of odd numbered HARQ processes or at least some and preferably all HARQ processes of the subset being processes being one of even numbered HARQ processes. In this variation, to achieve the pseudo transmission time interval the user equipment unit 30, for the extended mode, uses a selected HARQ process of the subset and a HARQ process outside the subset which is numerically adjacent the selected HARQ process.

Figure 4A:
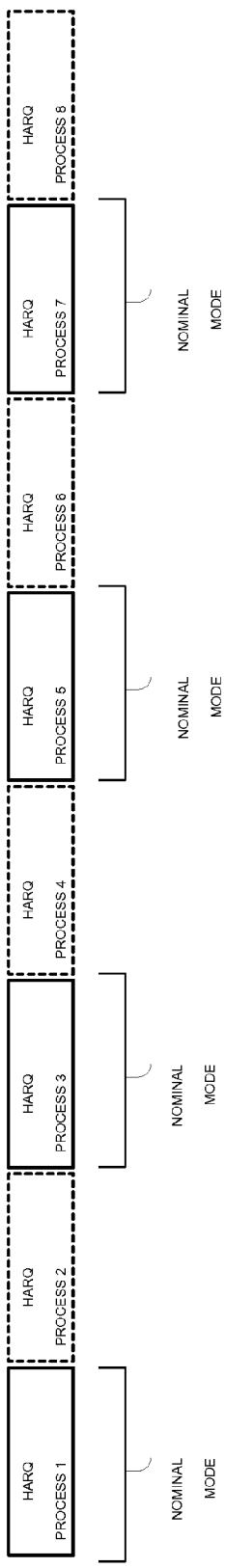
FIG. 4A is a diagrammatic view illustrating usage of a subset of HARQ processes for a nominal mode of operation.
Figure 4B:
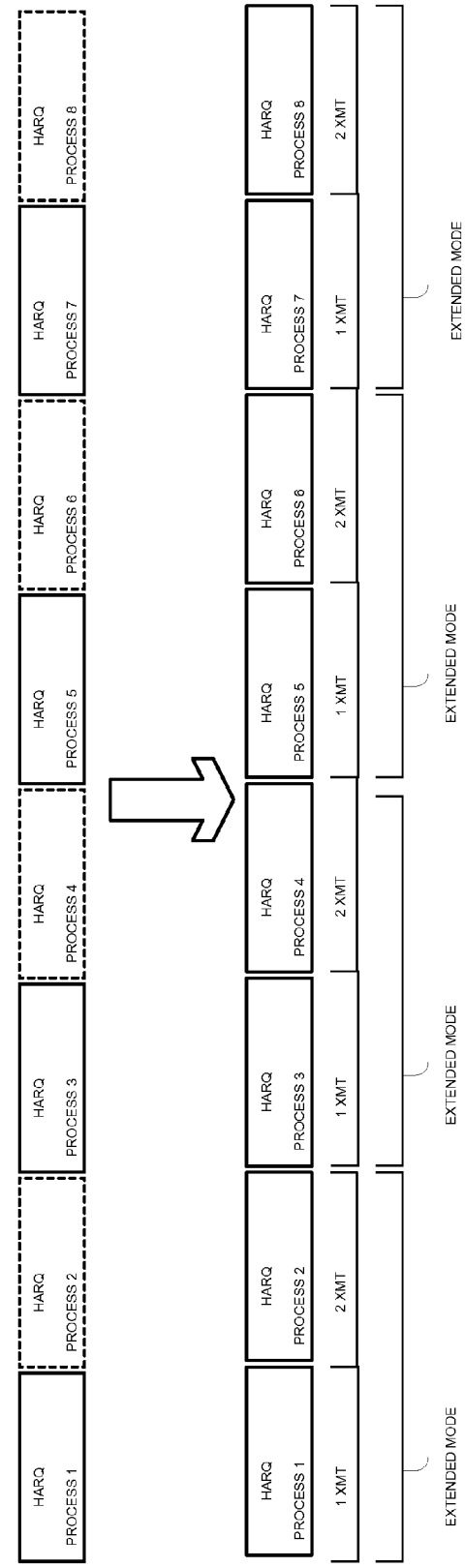
FIG. 4B is a diagrammatic view illustrating how a subset of HARQ processes such as that of FIG. 4B can instead be selectively utilized for a extended mode of operation.

In other words, in this variation, the "reserved code" on a channel such as the E-DPCCH or other channel is not needed. For example, for a 2 ms transmission time interval, the HARQ processes that the user equipment unit 30 is allowed to use is restricted. Of the eight total HARQ processes, the user equipment unit 30 can be constrained to use, for example, UE HARQ processes 1, 3, 5, 7. FIG. 4A shows such a restriction, with user equipment unit 30 being allowed for the nominal mode to use only the UE HARQ processes represented by solid rectangles (e.g., UE HARQ process 1, 3, 5, and 7). "Unallowed HARQ processes are depicted by broken line rectangles in FIG. 4A (e.g., UE HARQ process 2, 4, 6, and 8). Then, if there is a need to "expand" the TTI according to the present technology, the "extension" of a TTI can simply be detected by detecting energy on one of the disabled processes (on E-DPDCH), in this case HARQ process 2, 4, 6, or 8. This energy is then associated with the transmission on the previous process (e.g., HARQ process 2 can be associated with HARQ process 1 for forming a pseudo transmission time interval; HARQ process 4 can be associated with HARQ process 3 for forming a pseudo transmission time interval; and so forth), as shown in FIG. 4B Thus, the extended TTI can be deployed for each pair of subsequent HARQ processes, where the first is enabled, and the second is disabled. "Disabled" in this context then means that no "independent" HARQ transmission can take place in this process.

In many instances it may be necessary to tighten processing requirements in terms of ACK/NACK timing for the base station node 28 which receives a channel such as channel 31 (e.g., a E-DCH channel). In this regard, if the ACK/NACK feedback message is sent as normal after the pseudo transmission time interval has been decoded, the ACK/NACK feedback message will arrive too late for the user equipment unit 30 to be able to perform a retransmission in the correct HARQ process. To solve this concern, in one example implementation the base station node 28 can be required to decode the pseudo transmission time interval and send the ACK/NACK feedback for the pseudo transmission time interval at the point in time where normal feedback for the first TTI would have been sent.

In the above regard, in current E-DCH specifications the base station node 28 has approximately 6.1 ms to decode a TTI and send the ACK/NACK feedback message. In an example implementation, the timing requirement for the ACK/NACK generator 66 of base station node 28 is tightened to approximately 4.1 ms.

The foregoing is also illustrated in FIG. 3. In this regard, FIG. 3 shows the base station node 28 sending its ACK/NACK for a nominal mode transmission time interval after a fixed processing time, i.e., at a time a) after base station HARQ process 1 in FIG. 3. If HARQ processes 2 and 3 are combined to form a pseudo transmission time interval, the ACK/NACK for the pseudo transmission time interval can not be sent at the same fixed processing time after base station HARQ process 3, i.e., cannot be sent at time point c). Sending the ACK/NACK for the pseudo transmission time interval at time point c) would cause the ACK/NACK message to arrive too late at user equipment unit 30 for a retransmission in UE HARQ process 2. Instead, according to the improvement herein provided, the ACK/NACK for the whole pseudo transmission time interval (associated with HARQ processes 2 and 3) is transmitted at time point b). Time point b) is the normal time point for transmission of ACK/NACK for base station HARQ process 2; i.e., the point in time at which the acknowledgement message would have be generated had a transmission time interval of the nominal mode instead been generated. The ACK/NACK is indeed for the whole pseudo transmission time interval and thereby confirms the fact that the complete extended transmission (e.g., the soft combined data from the first transmission time interval of the extended mode and the second transmission time interval of the extended mode) can/has been successfully decoded. The user equipment unit 30 is made aware of this rule and uses the ACK/NACK received at b) to decide on a retransmission in UE HARQ processes 2 and 3 for the pseudo transmission time interval. Thus, the ACK/NACK transmitted at time point c) has no practical meaning in this scheme (although included in the figure merely for showing the advantage of the improvement).

In accordance with further differing implementation variations, the user equipment unit 30 can either mix or not mix (1) sending of data on channel 31 (e.g., the E-DCH channel) in the nominal mode and (2) sending of data on the channel 31 (e.g., the E-DCH channel) in the extended mode. In a preferred embodiment, the use of normal TTIs and pseudo transmission time intervals are not mixed, i.e., at a given point in time there are either eight 2 ms TTIs or four 4 ms pseudo transmission time intervals. This means that the user equipment unit 30 needs to complete its outstanding retransmissions on all processes before it switches between the TTI lengths (e.g. when approaching the cell border).

However in other implementation variations it is possible to mix normal and extended TTIs (i.e., pseudo transmission time intervals). In implementation variations in which mode mixing is allowed, the user equipment unit can be configured to utilize a first (predetermined) group of HARQ processes for the nominal mode and a second (predetermined) group of HARQ processes for the extended mode. In other words, in a mix-permitted implementation, HARQ processes 1, 2, 3, 4 can use 2 ms TTIs but HARQ processes 5+6 and 7+8 can be combined to form extended TTIs in a configurable fashion. This is done with minor impact on the E-TFC selection.

Further, in another example embodiment, the TTI length is varied dynamically. In this case an E-TFC selection algorithm decides for each (re)transmission if the transmission should be made in a normal or extended TTI. In this case the extended TTI can only be used if two consecutive TTIs are free, i.e. no retransmissions are ongoing in the affected HARQ processes. In this case it is also possible to change TTI length for the retransmission. In other words, a normal TTI can be used for the first transmission but an extended TTI can be used for the retransmission if the two needed HARQ processes are free.

Since the technology is particularly useful for enhancing the coverage of 2 ms TTI, the solution could be constrained to be used only when the user equipment unit 30 is power-limited. This means that the solution would be allowed only for transport blocks corresponding to the "minimum E-TFC" set.

Thus, for an example HSUPA implementation, the technology herein described allows, e.g., extension of the coverage for E-DCH by introducing autonomous retransmissions to create TTIs of 2 ms or 4 ms (e.g., pseudo transmission time intervals of 4 ms). The scheme can be used without modifications to the HARQ protocol or to the ACK/NACK signaling and with minimum changes to the specifications. In other example implementations, other TTI lengths are possible.

As an example it is possible at the cell border to collect energy from 8 ms (4 TTIs) in a delay budget of 20 ms instead of 50 ms for E-DCH with normal HARQ retransmissions (or energy can be collected from 12 ms transmissions in a delay budget of 36 ms instead of 82 ms with normal HARQ retransmissions)

Figure 5:
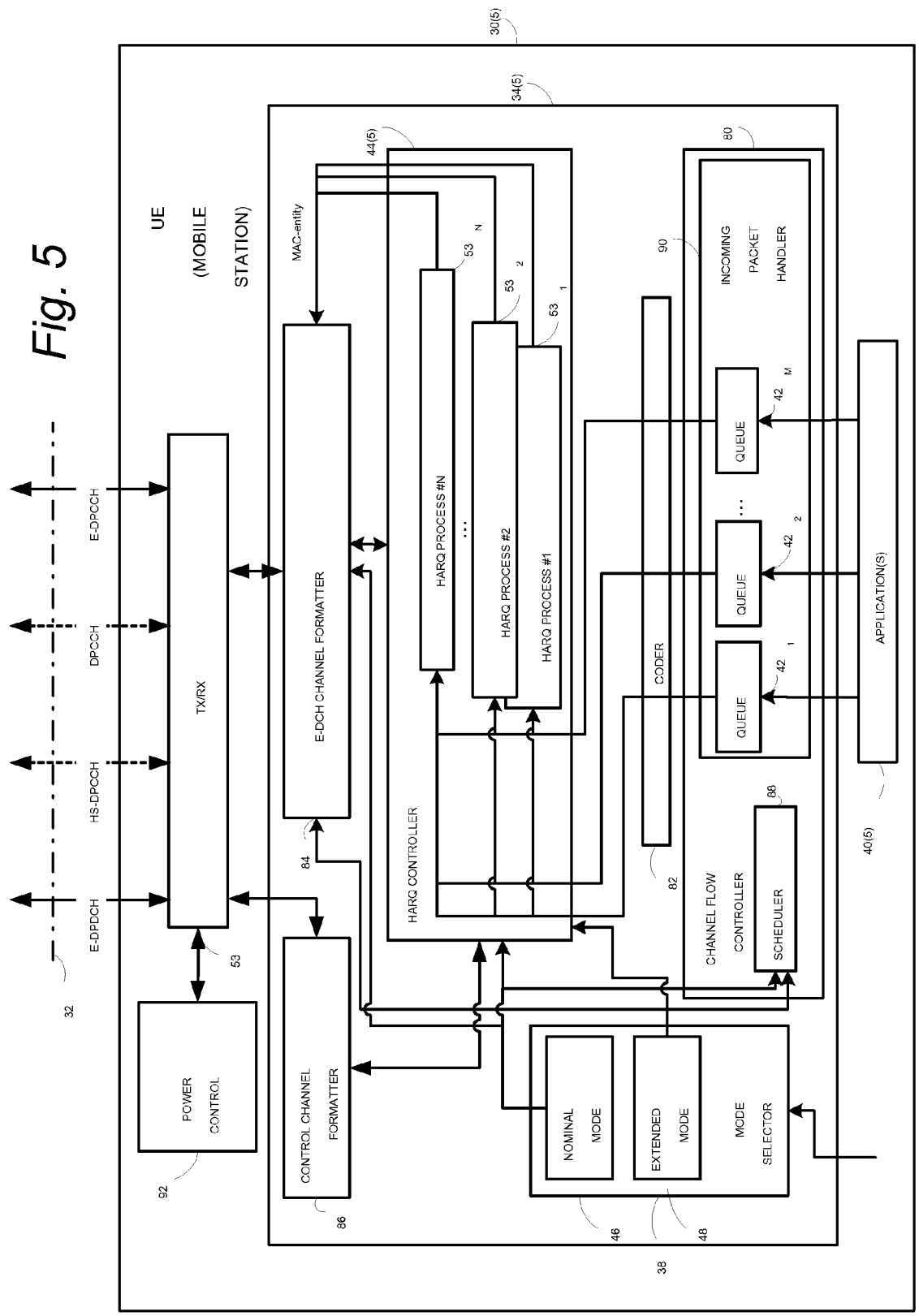
FIG. 5 is a schematic detailed view of an example embodiment of a user equipment unit.

FIG. 5 shows, in more detail, user equipment unit 30(5) according to one non-limiting, example HSUPA embodiment. In the FIG. 5 embodiment, E-DCH data source is shown to be one or more applications 40(5). The UE MAC-entity 34(5) of user equipment unit 30(5) is shown as including not only UE HARQ controller 44(5) and mode selector 38, but also channel flow controller 80; coder 82; E-DCH channel formatter 84; and control channel formatter 86. The channel flow controller 80 includes an E-DCH scheduler 88 and incoming packet handler 90. The incoming packet handler 90 includes one or more data queues, such as data queues $42_1$-$42_N$ shown in FIG. 5, each data queue 42 being associated with a different data flow (e.g., from a different one of the applications 40(5)). The E-DCH scheduler 88 controls the extraction of data from the data queues 42 and the formatting of the E-DCH channel by E-DCH channel formatter 84 in accordance with scheduling granted to the user equipment unit by base station node 28 in accordance with the scheduling information provided to the user equipment unit by base station node 28.

The coder 82 performs coding of the E-DCH-prone data prior to associating such data with an appropriate one of HARQ processes $53_1$-$53_N$ of UE HARQ controller 44(5). Coding actions performed by coder 82 can include, for example, multiplexing of data from different data queues 42 and adding MAC headers. The UE HARQ process $53_1$-$53_N$ of UE HARQ controller 44(5) correspond to the N number of transmission time intervals utilized for the E-DCH, e.g., N=eight in an example implementation.

FIG. 5 further shows that transceiver 53 transmits not only the E-DPDCH channel, but also other channels such as E-DPCCH, DPCCH, and HS-DPCCH. The content of control channels such as E-DPCCH is prepared and formatted by control channel formatter 86. The user equipment unit 30(5) also typically includes a power control unit 92.

The mode selector 38 can obtain information from, e.g., scheduler 88 so that the extended mode is selected when the minimum E-TEC is transmitted. Alternatively, mode selector 38 can get information from higher layer signaling received from the network (e.g., the network orders which mode to use with, e.g., RRC signaling). Other options for providing information to mode selector 38 are also encompassed, such as obtaining finroamtion from an E-TFC selection algorithm.

Figure 6:
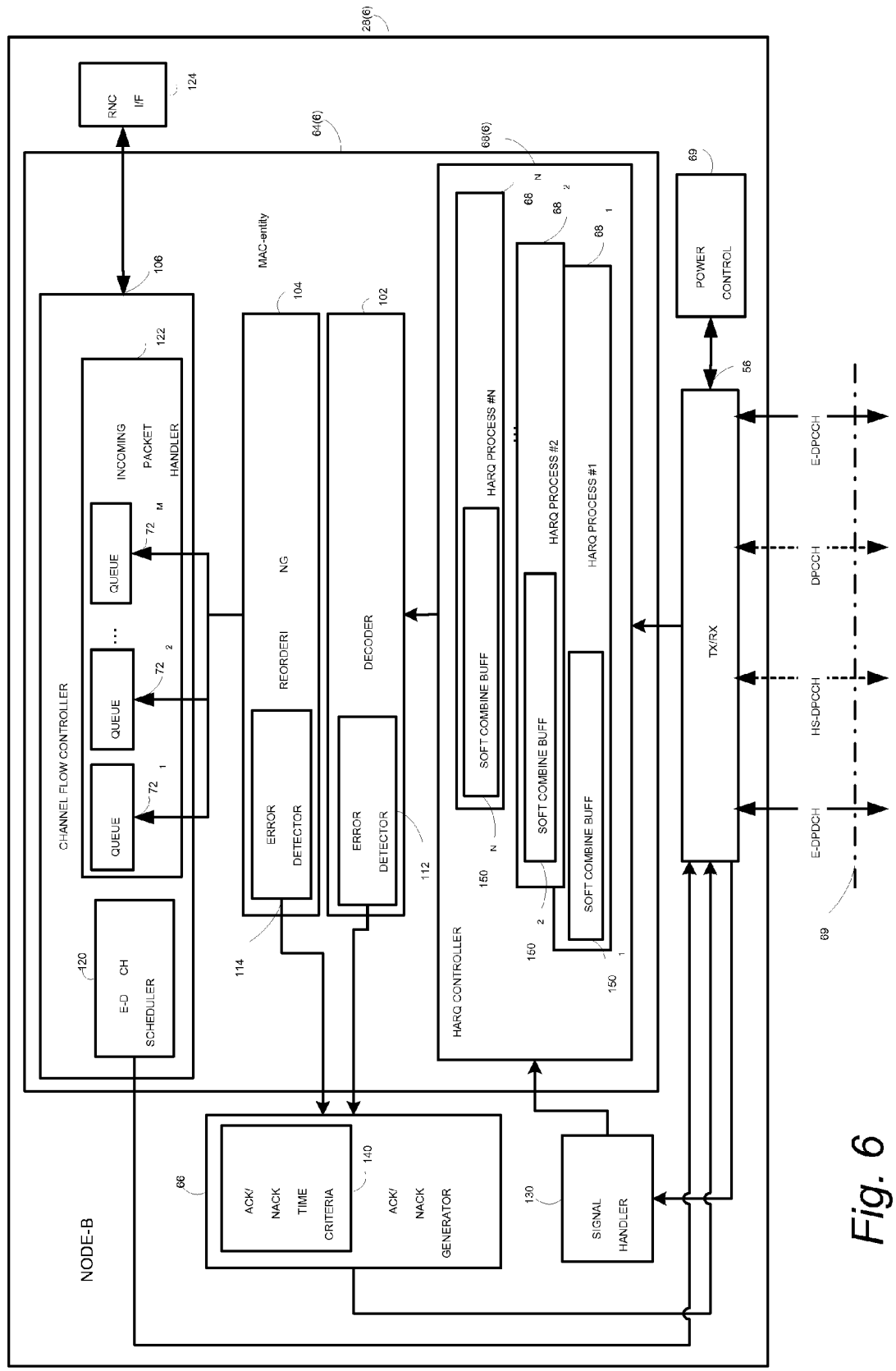
FIG. 6 is a schematic detailed view of an example embodiment of a base station node

FIG. 6 shows, in more detail, base station node 28(5) according to one non-limiting, example HSUPA embodiment. The base station MAC-entity 64(6) of base station node 28(6) is shown not only as comprising base station HARQ controller 68(6), but also decoder 102; reordering unit 104; and, channel flow controller 106.

Each of decoder 102 and reordering unit 104 can have respective error detection processes 112, 114. Decoding detector 112 detects when the coding algorithm detects an error; out-of-order detector 114 determines that data for a transmission time interval has not been received or lost. Both decoding detector 112 and out-of-order detector 114 are arranged to notify ACK/NACK generator 66, so that ACK/NACK generator 66 can generate an appropriate feedback message (e.g., either an ACK message or a NACK message). For this reason ACK/NACK generator 66 is shown as being connected to base station transceiver 56 in FIG. 6.

The channel flow controller 106 of base station node 28(6) includes E-DCH scheduler 120 and incoming packet handler 122. The E-DCH scheduler 120 actually determines which transmission time intervals the user equipment unit 30 can utilize, and sends information indicative thereof to E-DCH scheduler 88 of user equipment unit 30 (see FIG. 5). The incoming packet handler 122 includes plural data queues $72_1$-$72_M$, each data queue 72 being utilized for a different data flow. E-DCH data is conveyed from incoming packet handler 122 to an RNC interface 124

The base station node 28(6) further includes a signal handler 130 for handling signaling information, such as the E-DPDCH information of FIG. 2 which specifies which transmission time interval is reserved for being the second transmission time interval of a pseudo transmission time interval.

As indicated above, preferably ACK/NACK generator 66 of the base station node generates its feedback message (upon receipt of a pseudo transmission time interval) at a point in time at which the acknowledgement message would have been generated had a transmission time interval of the nominal mode instead been received, e.g., at point b) in FIG. 3. In one example implementation, for both the nominal mode and the extended mode the ACK/NACK generator 66 is configured to generate the acknowledgement message point 4.1 ms after receipt of the first transmission time interval of the pseudo transmission time interval. In another example implementation, the conventional processing time of 6.1 ms is kept for the nominal mode, but generation of the acknowledgement message for the extended mode occurs at the 4.1 ms time fter receipt of the first transmission time interval of the pseudo transmission time interval, such that the ACK/NACK for the extended mode occurs at the same tim as the ACK/NACK for the previous nominal mode reception. In another example embodiment, ACK/NACK generator 66 is provided with a settable ACK/NACK time criteria 140 so that the acknowledgement message point can be selectively changed to another value.

The base station HARQ controller 68 includes, for each of its base station HARQ processes, a corresponding soft combination buffer 150 for use in a soft combination operation.

It should be appreciated that the MAC-entities herein illustrated, such as UE MAC-entity 34 and base station MAC-entity 64, as well as the mode selector 38, can take various forms and be implemented in various ways. For example, the MAC-entities and the mode selector 38 can be realized by a processor or controller (which, as previously indicated, may include, without limitation, digital signal processor (DSP) hardware, read only memory (ROM) for storing software, random access memory (RAM), non-volatile storage, or any circuit or ASIC suitable for performing its functions).

Figure 7:
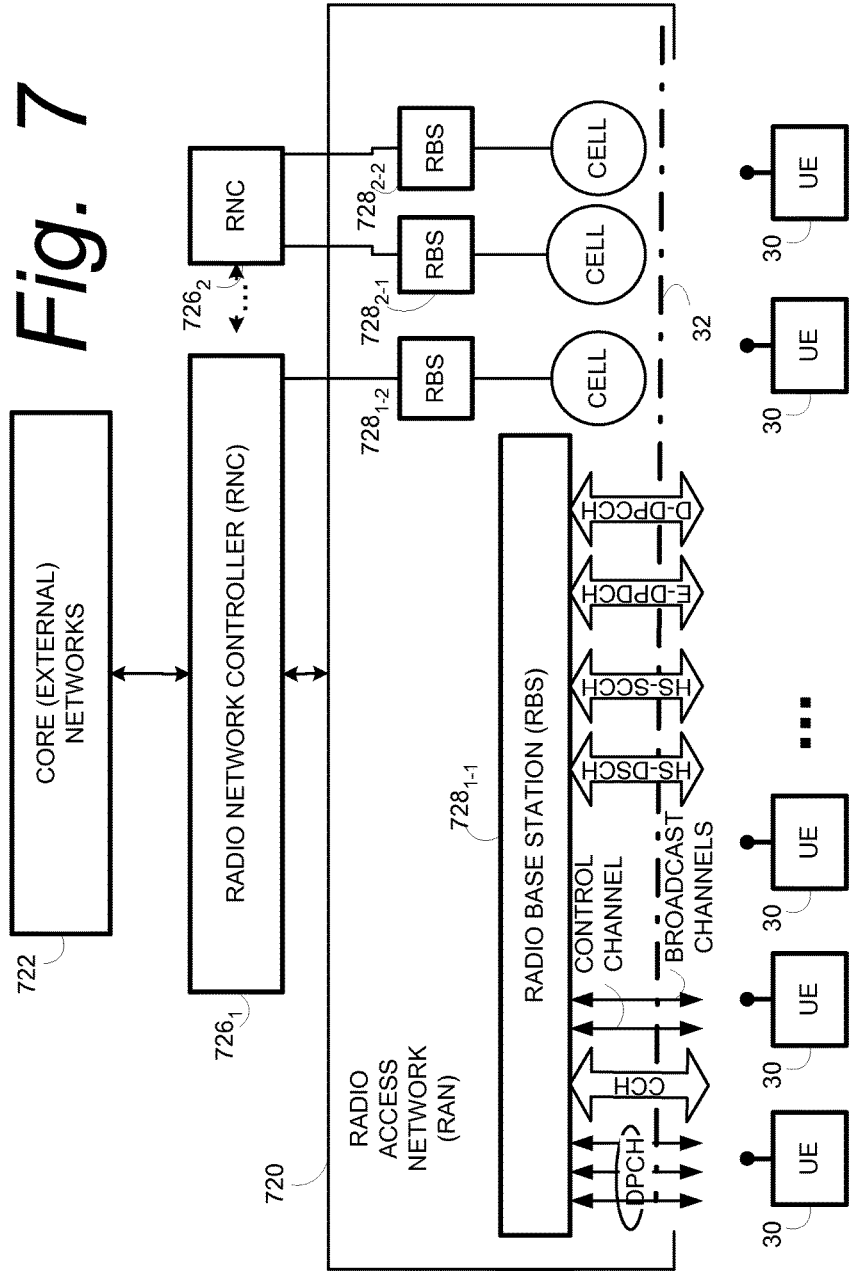
FIG. 7 is a schematic view of example mobile communications system in which an example embodiment of an extended channel (e.g., extended E-DCH channel) may be advantageously employed.

Basic aspects of an example generic embodiment of the technology are illustrated in broader context by the telecommunications system 720 shown in FIG. 7. For sake of clarity, telecommunications system 720 is shown as simply comprising a base station node (e.g., Node-B) 728 and a wireless node in the form of user equipment units (UE) 30. The telecommunications system 720 is configured so that at least one downlink packet channel exists over air interface 32 between base station node $728_{1-1}$ and at least some of the user equipment units (UE) 30. In addition, one or more uplink packet channels, such as E-DPDCH, as well as uplink control channel E-DPCCH, are transmitted in a second direction across air interface 32 (e.g., from user equipment unit (UE) 30 to base station node 728). The base station nodes 728 are connected to a radio network controller (RNC) node, such as RNC $726_1$ or RNC $726_2$. the RNC nodes are typically in turn connected to core network(s) 722.

Although various embodiments have been shown and described in detail, the claims are not limited to any particular embodiment or example. None of the above description should be read as implying that any particular element, step, range, or function is essential such that it must be included in the claims scope. The scope of patented subject matter is defined only by the claims. The extent of legal protection is defined by the words recited in the allowed claims and their equivalents. It is to be understood that the invention is not to be limited to the disclosed embodiment, but on the contrary, is intended to cover various modifications and equivalent arrangements.

What is claimed is:

1. A user equipment unit comprising:
    a transmitter configured to communicate data to a base station of a radio access network over a radio interface; and
    a MAC-entity configured to operate in
    a second mode of two different modes, wherein the second mode is an extended mode in which the data is transmitted in a pseudo transmission time interval of a length different than a single transmission time interval of a predetermined length associated with a first mode of the two different modes, the different length being a multiple of the predetermined length, the pseudo transmission time interval comprising a first transmission time interval and a second transmission time interval, the second transmission time interval being consecutive and adjacent to the first transmission time interval,
    wherein for both the first mode and the second mode the MAC-entity is configured to operate with a synchronous HARQ protocol in which re-transmissions occur a fixed number of transmission time intervals after a previous transmission or re-transmission, and
    wherein in the extended mode, the user equipment unit is configured to transmit the data in the first transmission time interval and to re-transmit the data in the second transmission time interval, wherein the data that is transmitted in the first transmission time interval is the same as the data that is re-transmitted in the second transmission time interval.

2. The user equipment unit of claim 1, wherein the first transmission time interval and the second transmission time interval are of the predetermined length.

3. The user equipment unit of claim 1, wherein the channel is an E-DCH channel, and wherein the predetermined length is 2 ms.

4. The user equipment unit of claim 1, wherein the user equipment unit is configured to signal that the data of the second transmission time interval is to be combined at the base station node with the data of the first transmission time interval.

5. The user equipment unit of claim 1, wherein the user equipment unit is configured to set a value on another channel to indicate that the data of the second transmission time interval is to be combined at the base station node with the data of the first transmission time interval.

6. The user equipment unit of claim 1,
    wherein the user equipment unit is configured to use a subset of HARQ processes for the nominal mode, the subset being non-consecutive HARQ processes, all HARQ processes of the subset being one of odd numbered HARQ processes or all HARQ processes of the subset being one of even numbered HARQ processes, and
    wherein the user equipment unit is configured to operate in the extended mode to achieve the pseudo transmission time interval by using a selected HARQ process of the subset and a HARQ process outside the subset which is numerically adjacent the selected HARQ process.

7. The user equipment unit of claim 6, wherein the user equipment unit is configured to signal the use of the extended mode by including on a signaling channel energy for the HARQ process which is outside the subset and numerically adjacent the selected HARQ process.

8. The user equipment unit of claim 1, wherein the user equipment unit is configured not to mix (1) sending of data on the channel in the nominal mode and (2) sending of data on the channel in the extended mode.

9. The user equipment unit of claim 1, wherein the user equipment unit is configured to mix (1) sending of data on the channel in the nominal mode and (2) sending of data on the channel in the extended mode.

10. The user equipment unit of claim 9, wherein the user equipment unit is configured to utilize a first group of HARQ processes for the nominal mode and a second group of HARQ processes for the extended mode.

11. The user equipment unit of claim 1,
    wherein the channel is an E-DCH channel,
    wherein the MAC-entity is configured to allocate the data to the single transmission time intervals of the E-DCH channel in the nominal mode and to allocate the data to the first transmission time interval and the second transmission time interval in the extended mode, and wherein the user equipment unit comprises a mode selector configured to specify to the MAC-entity whether the data is to be allocated in the nominal mode or the extended mode.

12. The user equipment unit of claim 1, wherein the pseudo transmission time interval including the second transmission time interval is before a point in time at which an ACK/NACK for the first transmission time interval is generated or would be generated had the data of the first transmission time interval been received.

13. The user equipment unit of claim 1, wherein the second transmission time interval is prior to a point in time at which an ACK/NACK would be received from the base station node had the base station node sent the ACK/NACK for the first transmission time interval of the pseudo transmission time interval.

14. The user equipment unit of claim 1, wherein the data of the first transmission time interval and the second transmission time interval are transmitted under auspices of different HARQ processes.

15. The user equipment unit of claim 1, further comprising a mode selector configured to specify to the MAC-entity whether the data is to be allocated in the nominal mode or the extended mode based on a mode select order received from the radio access network at a layer above a MAC layer.

16. A base station node of a radio access network (RAN) which receives data on an uplink channel over an air interface from a user equipment unit, the base station node comprising:
    a transceiver configured to communicate over the air interface with the user equipment unit;
    a MAC-entity configured to operate for both a nominal mode and an extended mode with a synchronous HARQ protocol in which re-transmissions occur a fixed number of transmission time intervals after a previous transmission or re-transmission, and configured to make a selection between different modes of allocating data on the uplink channel, the MAC-entity being configured in accordance with the selection to allocate the data on the channel in:
    the extended mode in which the data is received in a pseudo transmission time interval, the pseudo transmission time interval comprising a first transmission time interval and a second transmission time interval, the second transmission time interval being consecutive and adjacent to the first transmission time interval, the first transmission time interval and the second transmission time interval each having a predetermined length equal the predetermined length of a single transmission time interval of the nominal mode, the nominal mode is one of the different modes of allocating data:
an ACK/NACK generator for generating an acknowledgement message upon receipt of the data in the pseudo transmission time interval at a point in time at which the acknowledgement message would have been generated had a transmission time interval of the nominal mode instead been received,
wherein in the extended mode, the base station node is configured to receive the data in the first transmission time interval and to re-receive the data in the second transmission time interval, wherein the data that is received in the first transmission time interval is the same as the data that is re-transmitted in the second transmission time interval.

17. The base station node of claim 16, wherein the ACK/NACK generator is configured to generate the acknowledgement message point 4.1 ms after the first transmission time interval of the pseudo transmission time interval.

18. The base station node of claim 16, wherein the uplink channel is an E-DCH channel, and wherein the predetermined length is 2 ms.

19. The base station node of claim 16, further comprising a signaling handler configured to notify the MAC-entity that the data received in the second transmission time interval is to be combined with the data received in the first transmission time interval.

20. The base station node of claim 19, wherein the signaling handler is configured to notify the MACentity that the data received in the second transmission time interval is to be combined with the data received in the first transmission time interval when a predetermined value is set on another channel.

21. The base station node of claim 16,
wherein the MAC-entity is configured to use a subset of HARQ processes for the nominal mode, the subset being non-consecutive HARQ processes, at least some HARQ processes of the subset being one of odd numbered HARQ processes or at least some HARQ processes of the subset being one of even numbered HARQ processes,; and
wherein the MAC-entity is configured to operate in the extended mode by using a selected HARQ process of the subset and a HARQ process outside the subset which is numerically adjacent the selected HARQ process.

22. The base station node of claim 21, wherein the base station node is configured to detect a use of the extended mode by detecting energy on a signaling channel for the HARQ process which is outside the subset and numerically adjacent the selected HARQ process.

23. The base station node of claim 16, wherein the user equipment unit is configured not to mix (1) sending of data on the uplink channel in the nominal mode and (2) sending of data on the uplink channel in the extended mode.

24. The base station node of claim 16, wherein the MAC-entity is configured to receive a mix of (1) data on the uplink channel in the nominal mode and (2) on the uplink channel in the extended mode.

25. The base station node of claim 16, wherein the MAC-entity is configured to use a first group of HARQ processes for the nominal mode and a second group of HARQ processes for the extended mode.

26. The base station node of claim 16, wherein the pseudo transmission time interval including the second transmission time interval is before a point in time at which an ACK/NACK for the first transmission time interval is generated or would be generated had the data of the first transmission time interval been received.

27. The base station node of claim 16, wherein the second transmission time interval is prior to a point in time at which an ACK/NACK would be received from the base station node had the base station node sent the ACK/NACK for the first transmission time interval of the pseudo transmission time interval.

28. The base station node of claim 16, wherein the data of the first transmission time interval and the second transmission time interval are transmitted under auspices of different HARQ processes.

29. The base station node of claim 16, wherein the base station node is configured to send a mode select order to the user equipment unit at a layer above a MAC layer indicating that the user equipment unit should allocate the data in one of the nominal mode and the extended mode.

30. A radio access network, comprising:
a user equipment unit configured to transmit data and a base station node configured to receive the data transmitted from the user equipment unit,
wherein the user equipment unit configured to operate with a synchronous HARQ protocol in which re-transmissions occur a fixed number of transmission time intervals after a previous transmission or retransmission and with capability of selectively sending the data on a channel using the synchronous HARQ protocol
in an extended mode, the extended mode being one of two different modes for allocating data on the channel, wherein in the extended mode data is transmitted in a pseudo transmission time interval, the pseudo transmission time interval comprising a first transmission time interval and a second transmission time interval, the second transmission time interval being consecutive and adjacent to the first transmission time interval, the first transmission time interval and the second transmission time interval each having a predetermined length equal the predetermined length of a single transmission time interval of a nominal mode, the nominal mode one of the different modes of allocating data; and
a base station node configured to communicate over an air interface with the user equipment unit, to receive the data on the channel either in the nominal mode or in the extended mode, and to generate an acknowledgement message upon receipt of the data in the pseudo transmission time interval at a point in time at which the acknowledgement message would have been generated had a transmission time interval of the nominal mode instead been received,
wherein in the extended mode, the user equipment unit is configured to transmit the data in the first transmission time interval and to re-transmit the data in the second transmission time interval wherein the data that is transmitted in the first transmission time interval is the same as the data that is re-transmitted in the second transmission time interval, and
wherein the second transmission time interval is prior to a receipt at the user equipment unit of an ACK/NACK from the base station node regarding the transmission of the data in the pseudo transmission time interval.

31. The radio access network of claim 30, wherein the channel is a E-DCH channel, and wherein the predetermined length is 2 ms.

32. The radio access network of claim 30, wherein the user equipment unit is configured to signal that the data of the second transmission time interval is to be combined at the base station node with the data of the first transmission time interval.

33. The radio access network of claim 30, wherein the user equipment unit is configured to set a value on another channel to indicate that the data of the second transmission time interval is to be combined at the base station node with the data of the first transmission time interval.

34. The radio access network of claim 30,
wherein the user equipment unit is configured to use a subset of HARQ processes for the nominal mode, the subset being non-consecutive HARQ processes, at least some HARQ processes of the subset being one of odd numbered HARQ processes or at least some HARQ processes of the subset being one of even numbered HARQ processes, and
wherein the user equipment unit is configured to operate in the extended mode by using a selected HARQ process of the subset and a HARQ process outside the subset which is numerically adjacent the selected HARQ process.

35. The radio access network of claim 34, wherein the user equipment unit is configured to signal the use of the extended mode by including energy on a signaling channel for the HARQ process which is outside the subset and numerically adjacent the selected HARQ process.

36. The radio access network of claim 30, wherein the user equipment unit is configured not to mix (1) sending of data on the channel in the nominal mode and (2) sending of data on the channel in the extended mode.

37. The radio access network of claim 30, wherein the user equipment unit is configured to mix (1) sending of data on the channel in the nominal mode and (2) sending of data on the channel in the extended mode.

38. The radio access network of claim 37, wherein the user equipment unit is configured to utilize a first group of HARQ processes for the nominal mode and a second group of HARQ processes for the extended mode.

39. The radio access network of claim 30,
wherein the user equipment unit comprises:
a UE MAC-entity configured to allocate the data to the single transmission time intervals of the channel in the nominal mode and to allocate the data to the first transmission time interval and the second transmission time interval in the extended mode;
a mode selector configured to specify to the UE MACentity whether the data is to be allocated in the nominal mode or the extended mode; and
a UE transceiver configured to communicate the data in transmission time intervals to the base station node over an air interface, and
wherein the base station node comprises:
a base station transceiver configured to communicate over the air interface with the user equipment unit;
a base station MAC-entity configured to operate with the synchronous HARQ protocol and with capability of receiving the data on a E-DCH channel either in the nominal mode or in the extended mode; and
an ACK/NACK generator configured to generate the acknowledgement message.

40. The radio access network of claim 30, wherein the pseudo transmission time interval including the second transmission time interval is before a point in time at which an ACK/NACK for the first transmission time interval is generated or would be generated had the data of the first transmission time interval been received.

41. The radio access network of claim 30, wherein the base station node is configured to soft combine the data of the second transmission time interval with the data of the first transmission time interval and to abort any ongoing decoding of the data of the first transmission time interval.

42. The radio access network of claim 30, wherein the second transmission time interval is prior to a point in time at which an ACK/NACK would be received from the base station node had the base station node sent the ACK/NACK for the first transmission time interval of the pseudo transmission time interval.

43. The radio access network of claim 30, wherein the data of the first transmission time interval and the second transmission time interval are transmitted under auspices of different HARQ processes.

44. The radio access network of claim 30, wherein the user equipment unit is configured to allocate the data in the nominal mode or the extended mode based on a mode select order received from the radio access network at a layer above a MAC layer.

45. A method of operating a radio access network (RAN), the method comprising:
transmitting data over an air interface from a user equipment unit to a base station node on a channel with a synchronous HARQ protocol in which re-transmissions occur a fixed number of transmission time intervals after a previous transmission or retransmission,
selecting between different transmission modes and thereby sending data over the air interface using the synchronous HARQ protocol wherein upon the data being sent in
an extended mode of the different transmission modes in which the data is transmitted in a pseudo transmission time interval, the pseudo transmission time interval comprising, a first transmission time interval and a second transmission time interval in which the data is re-transmitted, the second transmission time interval being consecutive and adjacent to the first transmission time interval, the first transmission time interval and the second transmission time interval having a predetermined length equal to the predetermined length of a single transmission time interval of a nominal mode, the nominal mode being one of the different transmission modes of allocating data, and
receiving the data on the channel at the base station node either in the nominal mode or in the extended mode,
wherein in the extended mode, the user equipment unit transmits the data in the first transmission time interval and re-transmit the data in the second transmission time interval, wherein the data that is transmitted in the first transmission time interval is the same as the data that is re-transmitted in the second transmission time interval, and
wherein the second transmission time interval is prior to a receipt at the user equipment unit of an ACK/NACK from the base station node regarding the transmission of the data in the pseudo transmission time interval.

46. The method of claim 45, further comprising, at the base station node, generating an acknowledgement message upon receipt of the data in the pseudo transmission time interval at a point in time at which the acknowledgement message would have been generated had a transmission time interval of the nominal mode instead been received.

47. The method of claim 45,
wherein the channel is a E-DCH channel, and
wherein the predetermined length is 2 ms.

48. The method of claim 45, further comprising signaling from the user equipment unit that the data of the second transmission time interval is to be combined at the base station node with the data of the first transmission time interval.

49. The method of claim 45, further comprising, at the user equipment unit, setting a value on another channel to indicate that the data of the second transmission time interval is to be combined at the base station node with the data of the first transmission time interval.

50. The method of claim 45, further comprising,
at the user equipment unit, using a subset of HARQ processes for the nominal mode, the subset being non-consecutive HARQ processes, at least some HARQ processes of the subset being one of odd numbered HARQ processes or at least some HARQ processes of the subset being one of even numbered HARQ processes, and
at the user equipment unit when operating in the extended mode, using a selected HARQ process of the subset and a HARQ process outside the subset which is numerically adjacent the selected HARQ process.

51. The method of claim 50, further comprising at the user equipment unit signaling the use of the extended mode by including energy on a signaling channel for the HARQ process which is outside the subset and numerically adjacent the selected HARQ process.

52. The method of claim 45, wherein the channel is an E-DCH channel, and the method further comprising not mixing (1) sending of data on the E-DCH channel in the nominal mode and (2) sending of data on the channel in the extended mode.

53. The method of claim 45, further comprising mixing (1) sending of data on the channel in the nominal mode and (2) sending of data on the channel in the extended mode.

54. The method of claim 53, further comprising utilizing a first group of HARQ processes for the nominal mode and a second group of HARQ processes for the extended mode.

55. The method of claim 45, wherein the pseudo transmission time interval including the second transmission time interval is before a point in time at which an ACK/NACK for the first transmission time interval is generated or would be generated had the data of the first transmission time interval been received.

56. The method of claim 45, further comprising the base station node soft combining the data of the second transmission time interval with the data of the first transmission time interval and aborting any ongoing decoding of the data of the first transmission time interval.

57. The method of claim 45, wherein the second transmission time interval is prior to a point in time at which an ACK/NACK would be received from the base station node had the base station node sent the ACK/NACK for the first transmission time interval of the pseudo transmission time interval.

58. The method of claim 45, wherein the data of the first transmission time interval and the second transmission time interval are transmitted under auspices of different HARQ processes.

59. The method of claim 45, further comprising sending a mode select order from the radio access network to the user equipment unit at a layer above a MAC layer indicating that the user equipment unit should allocate the data in one of the nominal mode and the extended mode.

60. A user equipment unit comprising:
a transmitter configured to communicate data to a base station of a radio access network over a radio interface; and
a MAC-entity configured to allocate data on a channel in an extended mode in a pseudo transmission time interval,
wherein the pseudo transmission time interval comprising a first transmission time interval and a second transmission time interval of essentially a same length, the first and second transmission times intervals being immediately adjacent of each other,
wherein the data is transmitted initially in the first transmission time interval and thereafter is immediately re-transmitted in the second transmission time interval,
wherein the data that is transmitted in the first transmission time interval is the same as the data that is re-transmitted in the second transmission time interval,
wherein the second transmission time interval being prior to a receipt from the base station of an ACK/NACK regarding the pseudo transmission time interval,
wherein the MAC-entity is configured to operate with the extended mode within a synchronous HARQ protocol in which re-transmissions occur a fixed number of transmission time intervals after a previous transmission or re-transmission.

61. The base station node of claim 16, wherein the base station node is configured to soft combine the data of the second transmission time interval with the data of the first transmission time interval and to abort any ongoing decoding of the data of the first transmission time interval.

62. The user equipment unit of claim 60, wherein the second transmission time interval is prior to a point in time at which an ACK/NACK would be received from the base station node had the base station node sent the ACK/NACK for the first transmission time interval of the pseudo transmission time interval.

63. The user equipment unit of claim 60, wherein the data of the first transmission time interval and the second transmission time interval are transmitted under auspices of different HARQ processes.

64. The user equipment unit of claim 60, further comprising a mode selector configured to specify to the MAC-entity whether the data is to be allocated in the extended mode or not based on a mode select order received from the radio access network at a layer above a MAC layer.

65. A method of operating a user equipment (UE) configured to communicate with a radio base station (RBS) of a radio access network (RAN) over an air interface, the method comprising:
determining, at the UE, to transmit data to the RBS in an extended mode, the extended mode one of two modes in which the UE can operate, the two modes further comprising a nominal mode;
transmitting, from the UE to the RBS, a first block of the data in a first transmission time interval (TTI) of a fixed duration; and
transmitting, from the UE to the RBS, a second block of the data in a second (TTI) of the fixed duration, the second TTI being immediately subsequent to the first TTI, wherein the UE operates within the extended mode with a synchronous HAW protocol in which re-transmissions occur a fixed number of TTIs after a previous transmission or re-transmission, wherein in response to the UE operating in the nominal mode, the first block of the data and the second block of the data are different blocks of the data, and wherein in response to the UE operating in the extended mode, the first block of the data and the second block of the data are a same block of the data in which the same data is transmitted at least twice within the same block such that a first portion of the block comprises a first transmission of the data and one or more subsequent portions of the block comprise a corresponding one or more re-transmissions of the data such that the entire same block is filled with the first transmission and each of the one or more retransmissions.

66. The method of claim 65, wherein when transmitting the data in the extended mode, the method further comprises sending, from the UE to the RBS, an explicit notification that the data blocks transmitted using the first and second HARQ processes are to be combined.

67. The method of claim 66, wherein when transmitting the data in the extended mode, the notification is sent to the RBS substantially coincident in time with the transmission of the second block.

68. The method of claim 65, wherein when transmitting the data in the extended mode, the second block is transmitted prior to receiving, at the UE, an ACK/NACK from the RBS regarding the transmission of the first block.

69. The method of claim 65, further comprising receiving, at the UE, a mode select order from the RAN at a layer above a MAC layer, wherein in the step of determining whether to transmit the data to the RBS in the nominal mode or the extended mode, the determination is based on the mode select order received from the RAN.

70. A method of operating a radio base station (RBS) of a radio access network (RAN) configured to communicate with a user equipment (UE) over an air interface, the method comprising:

receiving, at the RBS, a first block of data transmitted from the UE in a first transmission time interval (TTI) of a fixed duration;

receiving, at the RBS, a second block of data transmitted from the UE in a second (TTI) of the fixed duration, the second TTI being immediately subsequent to the first TTI;

receiving, at the RBS, an indication from the UE of whether or not the first and second data blocks are to be combined;

decoding, at the RBS, the first block of data and the second block of data based on the indication; and sending, from the RBS, an ACK/NACK to the UE based on the decoding, wherein the RBS operates with a synchronous HARQ protocol in which re-transmissions occur a fixed number of TTIs after a previous transmission or re-transmission, the first block of data and the second block of data received with the synchronous HARQ protocol, and wherein when the indication is that the first and second data blocks should be combined, the step of decoding the first block of data and the second block of data comprises combining the first block of data and the second block of data, and decoding the combined block, in which the same data is transmitted at least twice within the same block such that a first portion of the block comprises a first transmission of the data and one or more subsequent portions of the block comprise a corresponding one or more re-transmissions of the data such that the entire same block is filled with the first transmission and each of the one or more retransmissions, and the step of sending the ACK/NACK comprises sending the ACK/NACK based on the decoding of the combined block.

71. The method of claim 70, wherein when the indication is that the first and second data blocks are not to be combined, the step of decoding the first and second data blocks comprises decoding the individually the first and second data blocks, and the step of sending the ACK/NACK comprises sending the ACK/NACK based on the decoding of the first block and separately sending the ACK/NACK based on the decoding of the second block.

72. The method of claim 70, wherein the step of receiving the indication from the UE of whether or not the first and second data blocks are to be combined comprises receiving an explicit notification from the UE.

73. The method of claim 70, further comprising sending a mode select order to the UE at a layer above a MAC layer indicating that the UE should operate in one of a nominal mode and an extended mode, wherein the nominal mode indicates to the UE that the first and second data blocks should be different, and wherein the extended mode indicates to the UE that the first and second data blocks should be same.

* * * * *

UNITED STATES PATENT AND TRADEMARK OFFICE
CERTIFICATE OF CORRECTION

PATENT NO.      : 9,882,683 B2
APPLICATION NO. : 11/536119
DATED           : January 30, 2018
INVENTOR(S)     : Torsner et al.

It is certified that error appears in the above-identified patent and that said Letters Patent is hereby corrected as shown below:

In Column 5, Line 12, delete "coding" and insert -- coding. --, therefor.

In Column 13, Line 6, delete ""Unallowed" and insert -- Unallowed --, therefor.

In Column 19, Line 6, in Claim 16, delete "equal" and insert -- equal to --, therefor.

In Column 19, Line 49, in Claim 21, delete "processes,; and" and insert -- processes, and --, therefor.

In Column 22, Line 43, in Claim 45, delete "comprising," and insert -- comprising --, therefor.

In Column 23, Line 19, in Claim 50, delete "comprising," and insert -- comprising: --, therefor.

In Column 24, Line 63, in Claim 65, delete "RBS." and insert -- RBS, --, therefor.

In Column 24, Line 64, in Claim 65, delete "second (TTI)" and insert -- second TTI --, therefor.

In Column 24, Line 67, in Claim 65, delete "HAW" and insert -- HARQ --, therefor.

In Column 25, Line 44, in Claim 70, delete "second (TTI)" and insert -- second TTI --, therefor.

Signed and Sealed this
Twenty-fourth Day of April, 2018

Andrei Iancu
*Director of the United States Patent and Trademark Office*